Aug. 5, 1941.  C. M. YODER  2,251,312
TRIMMING AND/OR CUTTING MECHANISM
Filed June 18, 1938  3 Sheets-Sheet 1

INVENTOR
Carl M. Yoder.
BY
Geo. B. Pitts ATTORNEY.

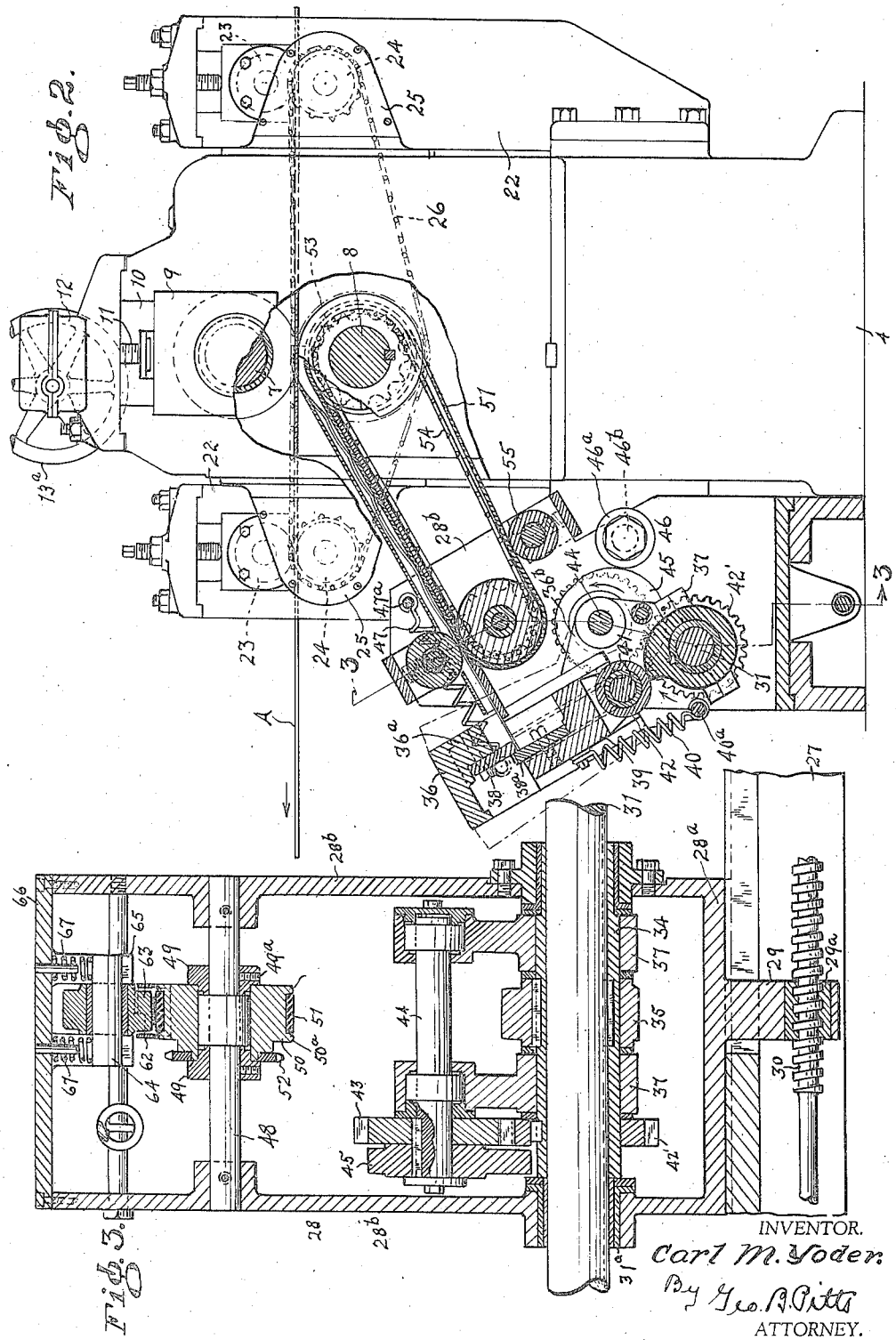

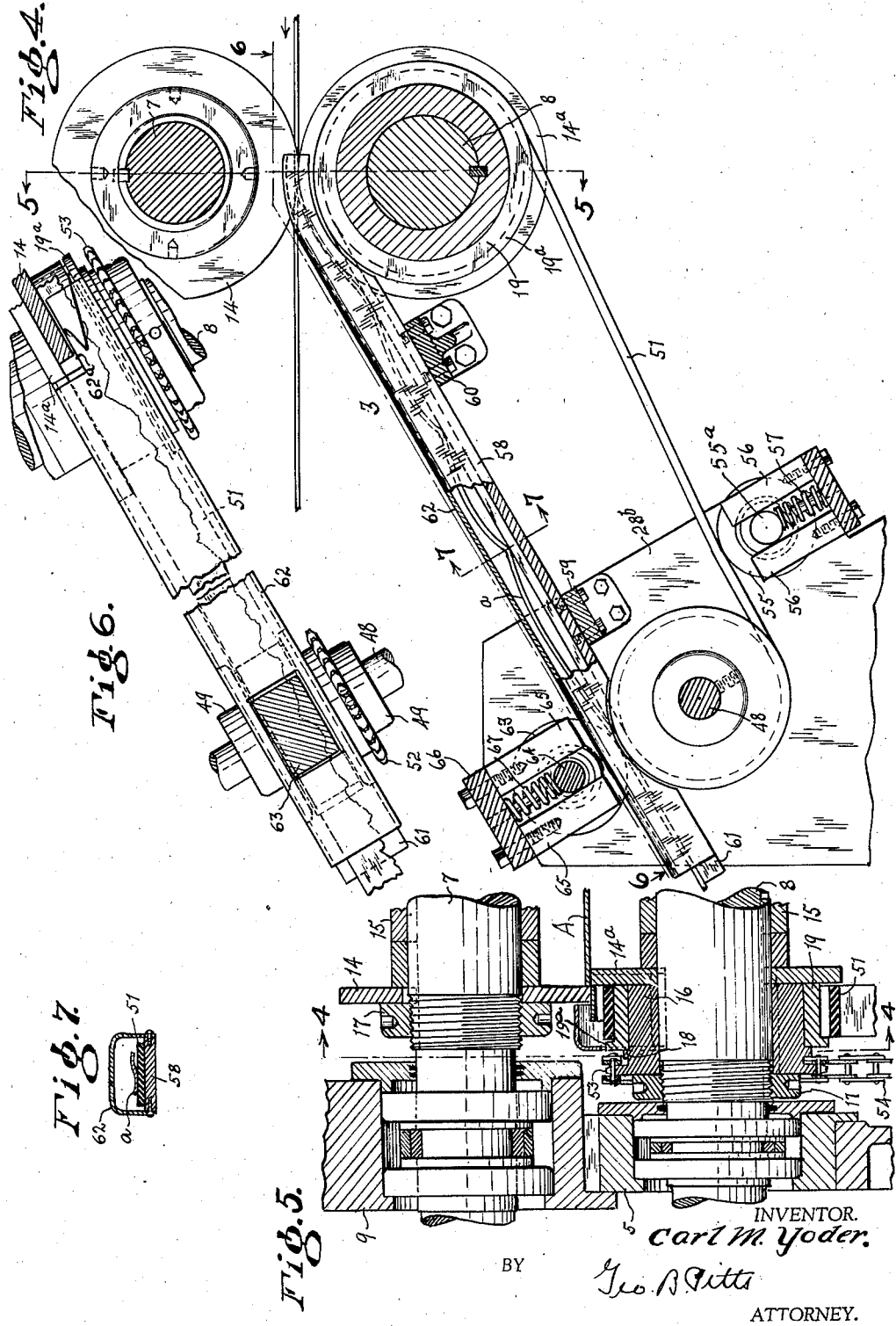

Patented Aug. 5, 1941

2,251,312

UNITED STATES PATENT OFFICE 2,251,312

TRIMMING AND/OR CUTTING MECHANISM

Carl M. Yoder, Lakewood, Ohio

Application June 18, 1938, Serial No. 214,467

13 Claims. (Cl. 164—10.6)

This invention relates to apparatus for trimming or cutting either or both edges of sheet material which may be supplied in various lengths or continuously. The apparatus is particularly adapted to trim sheet metal, and in the use of such term it is intended to be merely descriptive and not limiting as the invention lends itself for trimming other material. The sheet metal may be hot or cold rolled steel and of any desired thickness.

The invention relates more particularly to a guide or delivery means for conducting the trimmed off material away from the trimming elements and has important advantages in connection with a scrap cutting mechanism, as it is desirable for many reasons to cut the trimmed off material into short lengths as soon as it leaves the trimming elements.

In trimming sheet metal great difficulty has been experienced in conducting away and handling the trimmed off edge or material without it becoming tangled, twisted or doubled on itself and affecting the operation of the trimming elements and/or the scrap cutting mechanism, and in some instances the trimmed off material has twisted itself around into engagement with the trimmed material, after passing the trimming elements, and damaging such material. The edges of the material as supplied is very irregular and the marginal portion is often thinned down to a sharp terminating edge, so that the trimmed off portion varies in width. The action of the trimming elements tends to distort the trimmed off material so that contiguous portions thereof are flexed and twisted, thus making it difficult to control the movement of the trimmed off material away from the trimming elements and where the trimmed off material is narrow it often breaks, so that there is danger of the advancing end of the broken part being arrested or retarded and causing the material to double up on itself or get tangled, whereby various unsatisfactory conditions of one kind or another result.

One object of the invention is to provide for a trimming apparatus an improved guide for the trimmed off sheet material, whereby these difficulties are eliminated.

Another object of the invention is to provide an improved guide for the trimmed off sheet material wherein a portion of the guide moves with or at a speed faster than such material.

Another object of the invention is to provide an improved guide of this character that is relatively simple and which may be co-operatively associated with a trimming apparatus and a scrap cutting mechanism.

Other objects of the invention will be apparent to those skilled in the art to which my invention relates from the following description taken in connection with the accompanying drawings, wherein Fig. 1 is a front elevation of the trimming apparatus, scrap cutting mechanisms and guides for the trimmed off material, embodying my invention.

Fig. 2 is a side elevation of the parts shown in Fig. 1, partly in section on the line 2—2 of Fig. 1.

Fig. 3 is a section on the line 3—3 of Fig. 2, enlarged.

Fig. 4 is a fragmentary section on the line 4—4 of Fig. 1.

Figure 1:
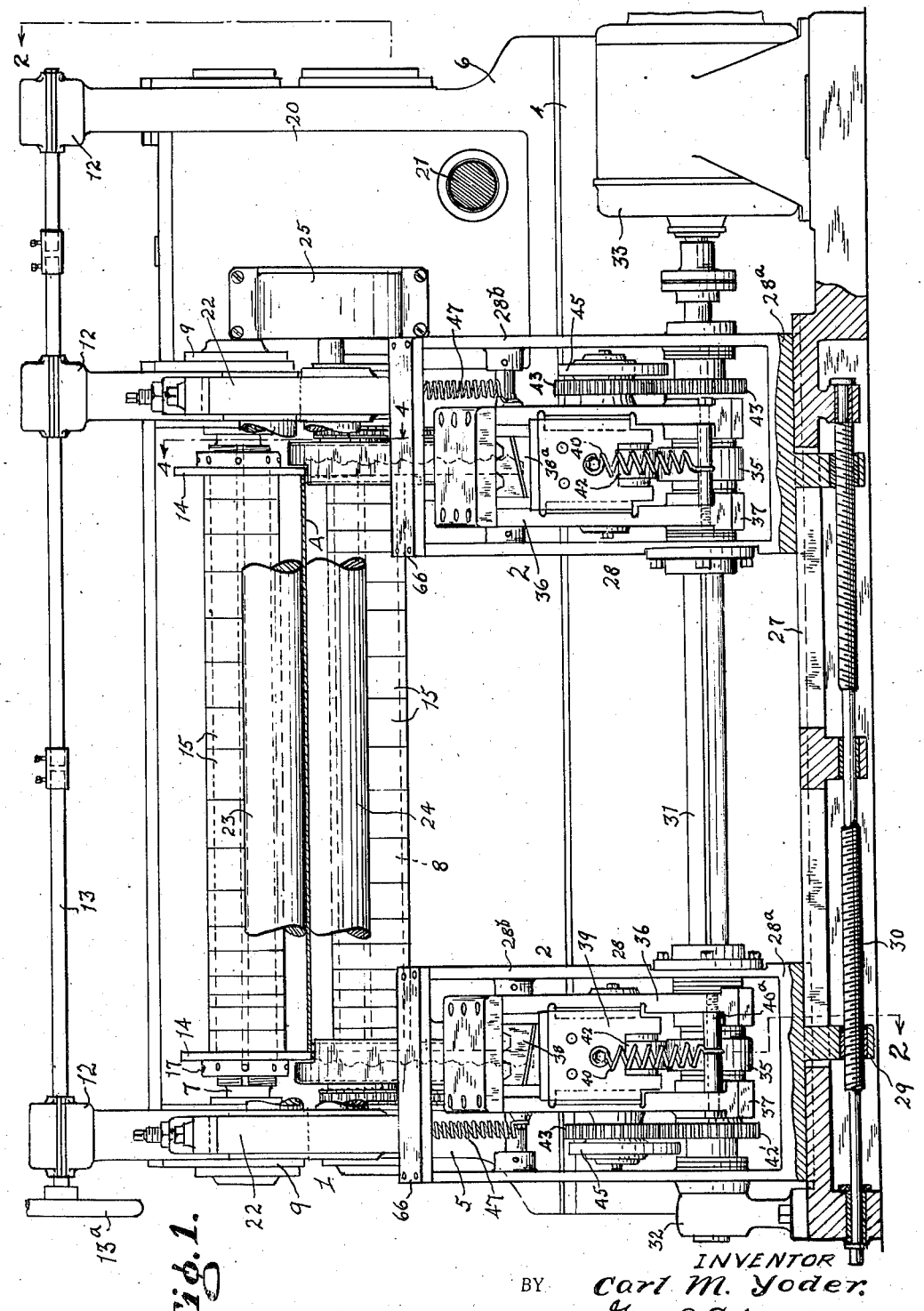

Figs. 5, 6 and 7 are sections on the lines 5—5, 6—6 and 7—7, respectively of Fig. 4.

In the drawings, 1 indicates as an entirety a trimming mechanism and 2, 2, indicates scrap cutting mechanisms, two such mechanisms being shown for reasons which will later be apparent, and 3 indicates as an entirety the guide associated with each set of trimming elements and leading therefrom to the adjacent scrap cutting mechanism 2.

The trimming mechanism may be of any desired construction, for example similar to that shown in my co-pending application Serial No. 12,818, filed March 25, 1935.

In the herein illustrated form of construction, 4 indicates a base on which are mounted spaced standards 5, 6, supporting suitable bearings of the anti-friction type for upper and lower shafts 7, 8, the bearings for the upper shaft 7 being provided in boxes 9 which are vertically adjustable in guides 10 provided in the standards 5, 6. The boxes are connected to the lower ends of screws 11 (one only being shown), so that the latter may rotate relative to the boxes and by their engagement with nuts in casings 12, such rotation will serve to raise or lower the boxes and thus adjust the upper shaft 7 relative to the lower shaft 8. A shaft 13 suitably geared to the screws 11 within the casings 12 and rotated by a hand wheel 13a, serves to simultaneously rotate the screws.

14—14a, 14—14a, indicate the sets of trimming elements disposed adjacent the opposite ends of the shafts 7, 8, and suitably keyed thereto. The sets of trimming elements may be arranged in any desired position longitudinally of the shafts by means of spacers 15. These elements are disposed so that the upper element 14 of each set is in a plane outwardly of the lower adjacent element 14a and the latter has associated with it a collar 16 which is also suitably keyed to the shaft 8 and may be adjusted therealong with the trimming element. The trimming elements and spacers on each shaft are clamped in fixed relation by nuts 17 threaded on the end portions of the shafts; but if desired either shaft may be provided at one end with an integral rib so that one nut only need be used to clamp these parts together. As shown in Fig. 5, the collar 16 is clamped by the adjacent nut 17 against the adjacent trimming element 14a. The collar 16, between the element 14a and an integral annular rib 18 thereon forms a bearing for a pulley 19 to to which reference will later be made. If desired, the collar 16 and trimming element 14a may be formed integrally.

The shafts 7, 8, are driven in opposite directions by suitable gearing within a housing 20, this gearing in turn being driven by a shaft 21 operated by a motor (not shown). The standard 6 is preferably constructed to support the housing 20 (see Fig. 1).

The front and rear sides of the base 4 are provided with auxiliary standards 22, each of which supports a pair of geared together pinch rolls 23, 24, for the sheet material A, the shaft for the lower roll being extended at one end and carrying on such end a sprocket within a casing 25. The sprockets are driven by a chain 26 which engages a sprocket fixed to the shaft 8. The shafts for each pair of the rolls 23, 24, may be supported similarly to the shafts 7, 8.

27 indicates a base member on which the scrap cutting mechanisms 2 are mounted for adjustment transversely to the direction of movement of the material A. The scrap cutting mechanisms are similar in construction except that the elements of one are reversely arranged with respect to the other for co-operative relation to the delivery of the trimmed off material. Each such mechanism consists of the following: 28 indicates as an entirety a frame having a bottom wall 28a guided on the base member 27 and side walls 28b. The bottom wall 28a is provided with a depending lug 29 in which is mounted a nut 29a engaging the screw threads on a shaft 30. By preference the shaft 30 is common to both nuts 29a and provided with right and left hand screw threads so that when the shaft 30 is rotated the frames 28 move toward or from each other. 31 indicates a shaft also common to both scrap cutting mechanisms 2, extending through bearings 31a provided in the side walls 28b and suitably supported at its outer end in a standard 32. The inner end of the shaft 31 is connected to and driven by the shaft of a motor 33 mounted on the base member 27. Between the side walls 28b the shaft 31 is provided with a sleeve 34, which is keyed thereto and which in turn has keyed to it a cam 35. 36 indicates a casing member provided at its lower end with spaced split collars 37 which rotatably fit the sleeve 34 on opposite sides of the cam 35. The upper end of the casing member 36 is provided with a transverse wall 36a to which is suitably bolted a cutting device 38. Below the wall 36a, the sides and inner walls of the casing member 36 form a guide for a reciprocatable slide 39 to which is suitably bolted a cutting device 38a arranged to co-act with the cutting device 38 to cut the trimmed off material a into lengths in successive operations of the slide 39. The slide 39 is normally biased away from the wall 36a by a spring 40 suitably connected to the slide at one end and at its opposite end anchored to a pin 40a supported at its opposite ends in the sides of the casing member 36. The lower end of the slide 39 is provided with bifurcations which support a shaft 41 and the latter in turn loosely supports a roller 42 arranged to be engaged by the cam 35. The cam 35 serves to move the slide 39 upwardly on each revolution of the cam, the effect of which is to cut the trimmed off material a as it is delivered to and between the cutting devices 38, 38a, in the manner later set forth. The rear side of the cam 35 recedes at a sharp angle (see Fig. 2) so as to permit the cutting device 38a to quickly move away from the cutting device 38 under the influence of the spring 40 to clear the advancing material a. Means are provided for oscillating the casing member 36 about the axis of the shaft 31 so as to move the cutting devices 38, 38a, with the material a during the cutting stroke, these means serving to move the devices in the direction in which the material moves at substantially the same rate of speed. The oscillating means consists of a gear 42' fixed to the sleeve 34 and meshing with a gear 43 keyed to a transverse shaft 44, which is suitably mounted in wings 36b extending rearwardly from the sides of the casing member 36. The shaft 44 has keyed to it a cam 45 which is arranged to engage a fixed member 46 the effect of which is to swing the casing member 36 about the axis of the shaft 31 in one direction, that is, in the direction in which the material a moves. A spring 47 is suitably connected to the casing member 36 at one end and at its opposite end it is anchored to a pin 47a provided on the adjacent side wall 28b. The spring 47 normally tends to swing the casing member 36 in the opposite direction and thus maintains the cam 45 in engagement with the fixed member 46. The cam 45 is shaped to control the oscillating movement of the casing member 36 in co-ordinated relation to the operation of the cam 35.

The fixed member 46 preferably comprises a roller 46a loosely mounted on a stud shaft 46b extending inwardly from the adjacent side wall 28b.

The guide and delivery means between each set of trimming elements 14, 14a, and the adjacent scrap cutting mechanism 2 are similar in construction except that the elements of one are reversely related with respect to corresponding elements of the other, so that reference is made to one guide and delivery means as follows: 48 indicates a shaft supported at its opposite ends in the sides 28b and provided with spaced collars 49 preferably fixed to the shaft by set screws 49a. The inner ends of the collars 49 are rabbeted to form bearings for a pulley 50 alined with the pulley 19 and co-operating therewith to support an endless member 51, preferably formed of rubber or fabric coated with rubber. The pulley 50 is provided on both sides with flanges 50a (see Fig. 3), whereas the pulley 19 is provided with a flange 19a on its outer side only so that the inner edge of the belt may be in the plane of the inner edge of the trimmed off material a (see Fig. 5). The endless member 51 is driven at the same rate of speed or faster than that at which the trimmed off material a moves so as to provide a carrier therefor, insuring its movement away from the trimming elements and also providing for its delivery into and between the cutting devices 38, 38a, of the scrap cutting mechanism, as well as eliminating walls or abutments which would stop or retard the movement of the material *a*. For the purpose of driving the member 51, I provide on the hub of the pulley 50 a sprocket 52 around which and a sprocket 53, provided on the collar 16, runs a chain 54, so that the shaft 8 through the collar 16, sprocket 53, chain 54 and sprocket 52 and pulley 50 drives the endless member 51, this arrangement of drive serving to rotate the pulley 19, which has a diameter less than that of the trimming element 14*a*, relative thereto so that the surface speed of the pulley will be equal to or greater than the surface speed of the trimming element. The endless member 51 is maintained taut by a roll 55 in engagement therewith and supported by a shaft 55*a* slidably mounted between pairs of guides 56 and normally biased toward the endless member by a spring 57. 58 indicates a plate mounted on brackets 59, 60, carried by the adjacent standard and frame 28, respectively, and extending from the pulley 19 to the pulley 50 in a plane substantially tangential thereto so as to support the upper run of the endless member 51, and by preference I provide a supporting plate 61 which extends from the endless member 51 substantially at the point of its engagement with the pulley 50 to a point adjacent the cutting devices 38, 38*a*, so as to guide the material *a* thereto. 62 indicates a hood, preferably of substantially inverted U-shape in cross section, suitably secured along its opposite sides to the side edges of the plate 58 by screws (see Fig. 7). The hood encloses the material *a* as it is moved along by the endless member 51. The hood 62 extends from the trimming elements 14, 14*a*, to a point adjacent the outer end of the plate 61. The side walls of the hood serve to prevent the material *a* from twisting laterally and its top wall prevents the material from bulging upwardly and operates through any bulging portions thereof to maintain the material in engagement with the endless member 51. As the endless member is driven, there is a continuous effort or influence to move the material along and overcome any frictional resistance thereof due to its engagement with the walls of the hood. As the endless member has a soft elastic surface, the material *a*, especially ends or rough edges thereof, will dig into this surface and become connected to it and effect a positive movement to the material. The upper end of the hood is cut away at 62*a* to accommodate the element 14 so that its end portion may extend beyond the trimming elements, that is, in advance of the point where these elements co-act so that such end portion may be in position to engage the trimmed off material *a* in the event the latter is not deflected downwardly by the action of the trimming elements. 63 indicates a roll arranged in opposed relation to the pulley 50 for pressing the material *a* agianst the endless member 51 and serving to insure its movement therewith. The roll 63 is loosely mounted on a shaft 64, the ends of which are slidably mounted in pairs of guides 65 secured to and depending from a plate 66 carried by the upper ends of the side walls 28*b*. Between the plate 66 and the ends of the shaft 64 I provide expansion springs 67 which normally tend to force the shaft downwardly and thus effect yielding engagement of the roll 63 with the material *a*, as shown in Figs. 2 and 3. The walls of the hood 62 are cut away to accommodate the roll 63.

In operation the material A is fed to the front pair of pinch rolls 23, 24, which feed it to the sets of trimming elements, the trimmed material then passes to and through the rear pinch rolls 23, 24, whereas the trimmed off material *a* is directed downwardly and carried along by the endless member to the scrap cutting mechanism.

As the shaft 31 is driven at a predetermined speed, the scrap cutting devices 38, 38*a*, will effect cutting of the material *a* into substantially uniform lengths.

Either or both edges of the material A may be trimmed; where one edge only is to be trimmed the trimming elements at the opposite side of the shafts 7, 8, are removed. The spacers 15 permit slitters or shaping rolls to be positioned on the shafts 7, 8, so that other operations on the material A may be carried out simultaneously with the trimming thereof.

To those skilled in the art to which my invention relates, many changes in construction and widely differing embodiments and applications of the invention will suggest themselves without departing from the spirit and scope of my invention. The disclosures and the description herein are purely illustrative and are not intended to be in any sense limiting.

It will be noted that this application embodies certain improvements in scrap cutting mechanism. No claim is made to such subject-matter in its broader aspects in this application as the same is covered in my aforesaid co-pending application.

What I claim is:

1. In mechanism of the class described, the combination with means for feeding sheet material and a pair of elements for trimming one edge of the material, of guide means for the trimmed off material, said guide means comprising side walls and a bottom having their receiving end related to said trimming elements, said bottom consisting of one run of an endless member, and means for driving said endless member.

2. In a mechanism of the class described, the combination with means for feeding sheet material and a pair of elements for trimming one edge of the material, of guide means for the trimmed off material, said guide means including an endless member, one run of which at its inner end is related to said trimming elements, the pulley for the inner end of said endless member being rotatable on an axis coincidently related to the axis of one of said elements, and means for driving said endless member.

3. In mechanism of the class described, the combination with means for feeding sheet material, a pair of driven shafts and elements fixed to said shafts for trimming one edge of the material, of guide means for the trimmed off material, said guide means including an endless member, one run of which at its inner end is related to said trimming elements, the pulley for the inner end of said endless member being rotatable about and relative to one of said shafts, and means for driving said endless member.

4. In mechanism of the class described, the combination with means for feeding sheet material, a pair of elements for trimming one edge of the material and a scrap cutting mechanism, of a guide means for the trimmed off material, said guide means including an endless member, one run of which is related at its opposite ends to said trimming elements and said scrap cutting mechanism, and a wall spaced from said endless member run and extending at its inner end to a point in advance of said trimming elements, and means for driving said endless member.

5. In mechanism of the class described, the combination with a support and means for feeding sheet material, of spaced standards on said support and provided with bearings, a pair of driven shafts mounted in said bearings, elements mounted on said shafts for trimming one edge of the material, a pulley loosely mounted on one of said shafts adjacent the element thereon, a separate pulley mounted on said support and co-operating with the first mentioned pulley to support an endless member, and means for driving one of said pulleys.

6. In mechanism of the class described, the combination with a support and means for feeding sheet material, of spaced standards on said support and provided with bearings, a pair of driven shafts mounted in said bearings, elements mounted on said shafts for trimming one edge of the material, a pulley mounted to rotate about one of said shafts, a separate pulley mounted on said support and co-operating with the first mentioned pulley to support an endless member, means for driving one of said pulleys, and means for adjusting said elements and the adjacent pulley laterally.

7. In mechanism of the class described, the combination with a support, means for feeding sheet material and a scrap cutting mechanism, of spaced standards on said support and provided with bearings, a pair of driven shafts mounted in said bearings, a set of elements mounted on said shafts for trimming one edge of the material, a pulley loosely mounted on one of said shafts, a separate pulley mounted on said support and co-operating with the first mentioned pulley to support an endless member with the upper run in operative relation to said set of elements, means for driving one of said pulleys, and a guide leading from said upper run to said scrap cutting mechanism.

8. In mechanism of the class described, the combination with a support and means for feeding sheet material, of spaced standards on said support and provided with bearings, a pair of driven shafts mounted in said bearings, elements mounted on said shafts, a pulley mounted to rotate about one of said shafts, a separate pulley mounted on said support, an endless member formed of resilient material mounted on said pulleys, and means for driving one of said pulleys.

9. In mechanism of the class described, the combination with supporting means, means for feeding sheet material, a pair of elements rotatably mounted on said support for trimming one edge of the material and a scrap cutting mechanism, of guide means between said trimming elements and said scrap cutting mechanism, and comprising an endless member, one run of which is operatively related at its opposite ends to said trimming elements and said scrap cutting mechanism and a hood on said supporting means and enclosing said run and having side walls disposed along opposite sides thereof.

10. A mechanism as claimed in claim 9 wherein a presser roll is mounted on said support adjacent the outer end of said hood for engaging the trimmed off material on the run of said endless member.

11. A mechanism as claimed in claim 9 wherein the outer end of said hood extends to a point in advance of said trimming elements.

12. In mechanism of the class described, the combination with a support, means for feeding sheet material and a pair of elements rotatably mounted on said support for trimming one edge of the material, of guide means for the trimmed off material leading from said trimming elements, and comprising an endless member, one run of which is operatively related at its receiving end to said trimming elements, and a hood on said support having side walls disposed along opposite sides of said run.

13. In a scrap cutting mechanism, the combination with a support, of a driven shaft mounted on said support, a casing member mounted at one end to oscillate about the axis of said shaft, a cutting device fixed to said member, a slide reciprocatably mounted on said member and carrying a cutting device arranged to co-act with said first mentioned device to cut material, a cam on said shaft arranged to engage said slide and operate it in one direction, means for operating the slide in the opposite direction, a fixed member on said support, a transverse shaft on said casing member, drive means between said driven shaft and said transverse shaft, a cam on said transverse shaft arranged to engage said fixed member, a spring connected to said casing member and operating therethrough to normally maintain said last mentioned cam in engagement with said fixed member, said last mentioned cam co-acting with said fixed member to oscillate said casing member and shaped to control the movement thereof in co-ordinated relation to the movement of said slide.

CARL M. YODER.